(12) United States Patent
Mulet Valles et al.

(10) Patent No.: US 11,273,993 B2
(45) Date of Patent: Mar. 15, 2022

(54) MACHINE AND METHOD FOR POSITIONING OBJECTS

(71) Applicant: Tomas Mulet Valles, Matadepera (ES)

(72) Inventors: Tomas Mulet Valles, Matadepera (ES); Fernando Martinez Mendez, Terrassa (ES)

(73) Assignee: Tomas Mulet Valles, Matadepera (ES)

( * ) Notice: Subject to any disclaimer, the term of this patent is extended or adjusted under 35 U.S.C. 154(b) by 25 days.

(21) Appl. No.: 16/982,381

(22) PCT Filed: Feb. 4, 2019

(86) PCT No.: PCT/EP2019/052661
§ 371 (c)(1),
(2) Date: Sep. 18, 2020

(87) PCT Pub. No.: WO2019/179685
PCT Pub. Date: Sep. 26, 2019

(65) Prior Publication Data
US 2021/0009360 A1 Jan. 14, 2021

(30) Foreign Application Priority Data
Mar. 21, 2018 (ES) .............................. ES201830276

(51) Int. Cl.
*B65G 47/24* (2006.01)
*B25J 9/00* (2006.01)
(Continued)

(52) U.S. Cl.
CPC .............. *B65G 47/24* (2013.01); *B25J 9/003* (2013.01); *B25J 9/0093* (2013.01); *B25J 9/1697* (2013.01); *B65G 47/90* (2013.01); *B65G 54/02* (2013.01)

(58) Field of Classification Search
CPC ........ B25J 9/003; B25J 9/0093; B25J 9/1697; B65G 47/24; B65G 54/02; B65G 47/90
(Continued)

(56) References Cited

U.S. PATENT DOCUMENTS 10,597,239 B2 * 3/2020 Eusebione ............. B65G 25/04
11,186,443 B2 * 11/2021 Boarin ................. B65G 47/842
(Continued)

FOREIGN PATENT DOCUMENTS

DE 102012210329 A1 12/2013
DE 102015103833 B3 2/2016
(Continued)

OTHER PUBLICATIONS

International Search Report and Written Opinion for Corresponding International Application No. PCT/EP2019/052661 (11 Pages) (dated May 15, 2019).
(Continued)

Primary Examiner — James R Bidwell
(74) Attorney, Agent, or Firm — Lucas & Mercanti, LLP (57) ABSTRACT

A machine and method for positioning objects is provided. The machine has a first conveyor belt configured to receive a plurality of objects; machine vision device configured to identify the position and the shape of the objects; robotic collection device configured to collect the objects according to the information received from the machine vision device; and a second conveyor belt configured to enable the outlet of the objects. The transfer conveyor has transfer carriers configured to move in a closed loop through it enabling the speed and position thereof to be controlled independently, where the transfer carriers are configured to receive the objects coming from the robotic collection device and deliver the objects to the second conveyor belt.

16 Claims, 9 Drawing Sheets

(51) Int. Cl.
*B25J 9/16* (2006.01)
*B65G 47/90* (2006.01)
*B65G 54/02* (2006.01)

(58) Field of Classification Search
USPC ........................................ 198/400, 401, 402
See application file for complete search history.

(56) References Cited

U.S. PATENT DOCUMENTS

| | | | |
|---|---|---|---|
| 2012/0330457 A1 | 12/2012 | Bourgeois et al. | |
| 2016/0200523 A1* | 7/2016 | Kato | B65G 47/24 198/401 |
| 2016/0297619 A1 | 10/2016 | Hahn | |
| 2019/0237351 A1* | 8/2019 | Krupyshev | H01L 21/67248 |

FOREIGN PATENT DOCUMENTS

| | | |
|---|---|---|
| EP | 1992561 A2 | 11/2008 |
| EP | 2743192 A1 | 6/2014 |
| EP | 2746165 A1 | 6/2014 |
| EP | 2757044 A1 | 7/2014 |
| EP | 3044136 A1 | 7/2016 |
| WO | 2014064593 A1 | 5/2014 |

OTHER PUBLICATIONS

International Preliminary Report on Patentability for Corresponding International Application No. PCT/EP2019/052661 (26 Pages) (dated Jun. 17, 2020).

* cited by examiner

MACHINE AND METHOD FOR POSITIONING OBJECTS

CROSS REFERENCE TO RELATED APPLICATION

This Application is a 371 of PCT/EP2019/052661 filed on Feb. 4, 2019 which, in turn, claimed the priority of Spanish Patent Application No. P 201830276 filed on Mar. 21, 2018, both applications are incorporated herein by reference.

FIELD OF THE INVENTION

The present invention relates to a machine and a method for positioning, by means of robotic handling, objects of different shapes and sizes, such as packaging, jars, bottles, industrial parts and components, etc., which need to be placed in a certain position, especially in a vertical and/or upright position, for the subsequent handling and/or industrial processing thereof, such as being packaged, packed, assembled, labelled, etc.

BACKGROUND OF THE INVENTION

Currently, the use of robotics for positioning objects is known. The fundamental concept consists of distributing the objects in a disorderly (random) manner on a conveyor belt, the advancing of which makes said objects pass beneath a machine vision camera such that the shape and position thereof are identified. The coordinates of said objects are sent to one or more robots, which dynamically go to search for said objects in movement, collecting them from the conveyor belt, whether by suction or grabbing them, in order to subsequently move them to the delivery area. The objects collected by the robots are deposited directly on a second conveyor belt in an ordered manner and in a specific position. Said second conveyor belt facilitates the outlet thereof from the machine to lead them to the following process. Document WO2014/064593A1 shows an example of these types of machines and methods for positioning objects.

Currently, there is a technological evolution that simplifies the previous process, called "bin picking", consisting of the ability to collect an element directly from a container or bin where it is heaped/unordered, by means of the use of 3D machine vision. In this manner, a portion of the process is eliminated along with the associated cost thereof, even though the speed with which the robot can act is penalized.

The absence of complex mechanisms in the robotic concept, without the presence of large elements in movement with the corresponding inertia thereof, the fact that it does not need large flows of compressed air, and the high accessibility of all the components thereof, (many of these being static, resulting in a more open and accessible machine due to the absence of carrousels, straps, etc.), make it so that the robotic concept is technically advantageous with respect to the conventional positioning systems.

Nevertheless, from a technical point of view, in all the robotic applications existing in the field of positioning objects there is a fundamental problem that has not been resolved, which is related to the maximum transfer speed of the objects from the robot to the outlet conveyor belt. Specifically, said transfer speed is considerably reduced due to the risk of the objects falling when they are deposited on the outlet conveyor belt, especially if they are unstable, when can be the case of longer lightweight packaging, such as plastic bottles, for example.

This aspect is precisely the one that currently limits the use of robots, especially for handling light and unstable elements. Meaning, even though the robot is very fast, in the end, in the process of delivering to the conveyor belt, it cannot just drop the object, but rather it must accompany it for a time on the conveyor belt until it matches the speed thereof, such that upon dropping the object inertia is not produced which would cause imbalance in said object, making it fall.

Furthermore, the space occupied by the robotic applications per unit produced and unit of time is also considerable, being a unoptimized factor in this type of application and, therefore, constituting a significant limitation when it is required to be implemented in installations with low surface availability.

The machine for positioning objects of the present invention resolves the previously explained problems in robotic applications, thanks to a simplified and compact technical solution that enables the positioning of the objects without needing to accompany them with the robot that collects them from the random position thereof. With this the maximum transfer speed is considerably increased.

Likewise, the method for positioning objects of the present invention enables:

in a first phase: handling the objects in random positions until they are provided with a specific arrangement (predetermined position) in a certain point (collection position); and in a second phase: transferring the objects from said collection position to another point (delivery position) wherein they are delivered continuously and ordered in the desired arrangement, especially in the vertical arrangement.

The machine and the method for positioning objects of the present invention enables a greater diversity of objects to be positioned at a faster speed than the current robotic applications.

DESCRIPTION OF THE INVENTION

The machine for positioning objects of the present invention comprises:

a first conveyor belt configured to receive a plurality of objects;

machine vision means configured to identify the position and the shape of the objects arranged on the first conveyor belt;

robotic collection means configured to collect the objects from the first conveyor belt according to the information received from the machine vision means; and a second conveyor belt configured to enable the outlet of said objects.

Generally, the arrangement of the objects on the first conveyor belt is random, especially when plastic packaging or other light objects are handled. Although the objects can also be arranged on the first conveyor belt in an orderly manner, for example, supplied in pallets for carrying objects, which tends to be the case for objects made out of glass or other fragile objects.

Likewise, the collection of the objects by the robotic collection means generally tends to be selective, meaning, based on certain conditions. For example; collecting the objects that are closest to the robotic collection means; collecting only the objects that arrive in a certain orientation and/or position, or have certain characteristics; collecting the objects that are easiest to deliver to the first conveyor belt, etc.

The machine for positioning objects of the present invention is characterised in that it comprises a transfer conveyor that has a plurality of transfer carriers configured to move in a closed loop through it enabling the speed and position thereof to be controlled independently, where said transfer carriers are configured to receive the objects coming from the robotic collection means and deliver said objects to the second conveyor belt.

The transfer carriers move on the transfer conveyor, also called an intelligent conveyor, by means of magnetic induction. Said independent carriers run in a controlled manner along the transfer conveyor, being able to be individually controlled at will by the user, regarding the position, speed, acceleration and strength thereof. Therefore, it enables a programmable sequential movement of the distinct transfer carriers.

Generally, the processes for collecting the objects coming from the robotic collection means and delivering them to the second conveyor belt are performed consecutively. Nevertheless, in other application cases, it is also possible to perform other intermediate operations or processes between the collection and the delivery of said objects. For example; processes of assembling, filling, blowing, closing, which can be carried out in the same transfer conveyor, as the objects are transported by the transfer carriers. The length and the path of the transfer conveyor adapt in order to make room for the distinct intermediate operations of the objects before the delivery thereof on the second conveyor belt (outlet band).

Preferably, the transfer carriers are configured to receive the objects coming from the robotic collection means in a predetermined position and deliver said objects to the second conveyor belt in a vertical position, meaning, upright or resting on the main supporting base thereof. Nevertheless, in other cases of application, the delivery position can be horizontal or adopt any other stable position of the object that enables the outlet thereof in an ordered manner (for example; resting on a flat face of it that is different from the supporting base).

According to a first preferred embodiment, the transfer carriers are configured to work in collaboration with each other, enabling the securing of an object coming from the robotic collection means by the pressure exerted on it by two adjacent transfer carriers between which said object is arranged, and the subsequent delivery thereof to the second conveyor belt after releasing said pressure. Thus, the transfer carriers are not conditioned by the geometry of the object.

This embodiment enables a wide variety of objects with different shapes and/or sizes to be worked with without needing to change accessories. Likewise, the operating sequence can be programmed and memorized for each distinct object, such that, the change from one object to another can be performed instantaneously and automatically by selecting each object format from the control panel of the machine.

Preferably, the transfer carriers are made up of first transfer carriers and by second transfer carriers, where the first transfer carriers and the second transfer carriers are distributed in an alternating manner along the transfer conveyor.

Preferably, each first transfer carrier comprises:
a first receiving profile configured to receive a first object; and
an additional first receiving profile, distinct and opposite from the first receiving profile, configured to receive a second object.

Preferably, each second transfer carrier comprises:
a second receiving profile configured to receive the first object; and
an additional second receiving profile, distinct and opposite from the second receiving profile, configured to receive the second object.

It enables an especially ideal securing to be obtained for different types of objects (cylindrical, prismatic, irregular, etc.), such that they are housed in a more fitted and stable manner between the transfer carriers.

According to a second preferred embodiment, the transfer carriers are made up of third transfer carriers, where each of them comprises a gripper configured to grip an object coming from the robotic collection means and deliver said object to the second conveyor belt.

This embodiment also enables a considerable variety of objects with different shapes and/or sizes to be worked with without needing to change accessories. Nevertheless, unlike the first embodiment, the transfer carriers work independently from each other. This enables the number of operations to be carried out by each of the transfer carriers during the collection and delivery of the objects to be reduced.

Preferably, the gripper is made up of:
a static gripper portion attached to the third transfer carrier; and
a dynamic gripper portion joined to the third transfer carrier by means of a joint.

In turn, the transfer conveyor comprises one or more opening cams in a static position distributed along it, configured to come into contact with the dynamic gripper portion as the third transfer carrier passes and to cause the rotation thereof with respect to the joint. Said rotation enables the gripper to be opened in order to collect or deliver the object.

Moreover, the transfer conveyor admits, for all the previously commented preferred embodiments, different assembly and/or location arrangements of said conveyor with respect to the first conveyor belt and the second conveyor belt. Said assembly and/or location arrangements have an influence on the space occupied by the machine, the compactness thereof and the accessibility of the components thereof.

According to a first assembly and/or location arrangement, the transfer conveyor is arranged in a tilted position between the first conveyor belt and the second conveyor belt. This first arrangement is very compact and offers good accessibility to the main components of the machine.

Preferably, in the first arrangement, the transfer carriers form a tilting angle with respect to the transfer conveyor, for example, of 45° or 135° staying vertically arranged in a collection position, and horizontally in a delivery position.

According to a second assembly and/or location arrangement, the transfer conveyor is arranged in a horizontal position between the first conveyor belt and the second conveyor belt. This second arrangement implies a greater amount of space occupied by the machine. On the other hand, the main components of the machine are at a fairly accessible height, and the number of operations necessary to perform the delivery of the second conveyor belt is reduced, given that the objects can be collected and delivered in the same position.

Preferably, in the second arrangement, the transfer carriers are arranged horizontally.

According to a third assembly and/or location arrangement, the transfer conveyor is arranged in a vertical position between the first conveyor belt and the second conveyor belt. This third arrangement implies a lesser amount of space occupied by the machine with respect to the previous arrangements. Furthermore, the transfer carriers can receive the objects coming from the robotic collection means in an inverted vertical position, and deliver them in the vertical position after a 180° rotation of the transfer carriers along the transfer conveyor. This inverted vertical position is ideal for the application of processes for blowing and/or emptying the packaging, normally focused on the cleaning thereof. On the other hand, since it is a taller machine, the main components of the machine are at a less accessible height.

Preferably, in the third arrangement, the transfer carriers are arranged vertically or horizontally.

The machine for positioning objects of the present invention can have built-in or external means of supplying the objects to be positioned. This means that the objects can arrive at the first conveyor belt from a containment or storage area for them that is integrated in the machine, or from an external location.

For more compactness, versatility and autonomy of the machine, it preferably has built-in supply means for the objects to be positioned. Specifically, the machine comprises:
a supply bin configured to hold the objects in a random manner; and
a lifter configured to collect the objects from the supply bin and arrange them on a first end of the first conveyor belt.

Likewise, as commented previously, the collection of the objects by the robotic collection means can be selective, meaning, of those objects that meet certain conditions. Such that the rest of the objects must return to the processing line and/or the supply means. To do so, preferably, the machine comprises a return track adjacent to a second end of the first conveyor belt, configured to receive the objects that arrive at said second end and return them to the supply bin using gravity.

Finally, the delivery of the objects to the second conveyor belt can be performed directly or indirectly with respect to it.

In the first case, the objects are delivered directly to the second conveyor belt, meaning, by depositing them directly on the second conveyor belt.

In the second case, the objects are delivered indirectly to the second conveyor belt, meaning, by depositing them onto a supporting base, also called a puck, transported by said second conveyor belt. These pucks offer a greater stability to the objects, once delivered to the second conveyor belt, which enables the delivery speed thereof to be increased and, therefore, the number of objects positioned per unit of time as well.

The method for positioning objects of the present invention comprises the following steps:
a) receiving a plurality of objects arranged randomly on a first conveyor belt;
b) identifying the position and the shape of the objects arranged on the first conveyor belt by means of machine vision means; and
c) collecting the objects from the first conveyor belt by means of robotic collection means according to the information received from the machine vision means.

Said method is characterised in that it additionally comprises the following steps:
d) receiving the objects coming from the robotic collection means by means of transfer carriers arranged in a transfer conveyor;
e) delivering said objects to a second conveyor belt by means of said transfer carriers in order to enable the outlet thereof; and
f) moving said transfer carriers in a closed loop through the transfer conveyor independently controlling the speed and position thereof in order to carry out steps d) and e).

Preferably, steps d) and e) respectively comprise the following steps:
d.1) receiving the objects coming from the robotic collection means in a predetermined position; and
e.1) delivering said objects to the second conveyor belt in a vertical position.

According to a first preferred embodiment, steps d) and e) respectively comprise the following steps:
d.2) securing an object coming from the robotic collection means by the pressure exerted on it by means of two adjacent transfer carriers between which said object is arranged; and
e.2) delivering said object to the second conveyor belt after releasing said pressure.

According to a first preferred embodiment, step f) comprises the following steps:
f.1.1) moving a first transfer carrier at a first speed to a collection position within reach of the robotic collection means;
f.2.1) detaining the first transfer carrier in the collection position;
f.3.1) receiving an object coming from the robotic collection means in a predetermined position, arranging it adjacently to the first transfer carrier;
f.4.1) moving a second transfer carrier at a second speed until it makes contact with the object adjacent to the first transfer carrier;
f.5.1) securing said object by the pressure exerted on it between the first transfer carrier and the second transfer carrier;
f.6.1) moving the first transfer carrier and the second transfer carrier to a delivery position on the second conveyor belt at a first speed and a second speed that are equal;
f.7.1) synchronising the first speed of the first transfer carrier and the second speed of the second transfer carrier with an outlet speed of the second conveyor belt;
f.8.1) accompanying the object along the second conveyor belt at the outlet speed; and
f.9.1) increasing the first speed of the first transfer carrier, maintaining the second speed of the second transfer carrier at the outlet speed in order to release the pressure on the object and drop it onto the second conveyor belt.

According to a second preferred embodiment, alternatively step f) comprises the following steps:
f.1.2) moving a third transfer carrier at a third speed to a collection position within reach of the robotic collection means;
f.2.2) detaining the third transfer carrier in the collection position;
f.3.2) receiving an object coming from the robotic collection means in a predetermined position, arranging it in a gripper of the third transfer carrier;
f.4.2) moving the third transfer carrier to a delivery position on the second conveyor belt at a third speed;
f.5.2) synchronising the third speed of the third transfer carrier with an outlet speed of the second conveyor belt;
f.6.2) accompanying the object along the second conveyor belt at the outlet speed; and
f.7.2) opening the gripper.

According to a first assembly and/or location arrangement, the transfer carriers receive the objects coming from the robotic collection means in a horizontal position and they deliver them in a vertical position to the second conveyor belt, in a transfer conveyor in a tilted arrangement between the first conveyor belt and the second conveyor belt.

According to a second assembly and/or location arrangement, the transfer carriers receive the objects coming from the robotic collection means in a horizontal position and delivers them in a vertical position to the second conveyor belt, in a transfer conveyor in a horizontal arrangement between the first conveyor belt and the second conveyor belt.

According to a third assembly and/or location arrangement, the transfer carriers receive the objects coming from the robotic collection means in an inverted vertical position and delivers them in a vertical position to the second conveyor belt, in a transfer conveyor in a vertical arrangement between the first conveyor belt and the second conveyor belt.

BRIEF DESCRIPTION OF THE DRAWINGS

What follows is a very brief description of a series of drawings that aid in better understanding the invention, and which are expressly related to three embodiments of said invention that are presented by way of non-limiting examples of the same.

DETAILED DESCRIPTION OF THE INVENTION

FIGS. 1-6 show different views of the machine (1) of the present invention, according to a first preferred embodiment. As seen, said machine (1) comprises:
a first conveyor belt (2) configured to receive a plurality of objects (O) arranged randomly;
machine vision means (3) configured to identify the position and the shape of the objects (O) arranged on the first conveyor belt (2);
robotic collection means (4) configured to collect the objects (O) from the first conveyor belt (2) according to the information received from the machine vision means (3), and to rotate or orient said objects (O) until they are left in a predetermined position ($P_O$); and
a second conveyor belt (5) configured to enable the outlet of said objects (O).

The machine (1) for positioning objects of the present invention is characterised in that it comprises a transfer conveyor (6) that has a plurality of transfer carriers (7, 7a, 7b) configured to move in a closed loop through it enabling the speed and position thereof to be controlled independently, where said transfer carriers (7, 7a, 7b) are configured to receive the objects (O) coming from the robotic collection means (4) and deliver said objects (O) to the second conveyor belt (5).

According to the present example, the machine vision means (3) comprise a machine vision camera and the robotic collection means (4) comprise two delta-type robotic arms, enabling a production capacity greater than 200 objects positioned per minute for the machine (1).

The transfer carriers (7, 7a, 7b) are configured to receive the objects (O) coming from the robotic collection means (4) in a predetermined position ($P_O$), in this case horizontal, and deliver said objects (O) to the second conveyor belt (5) in a vertical position ($O_V$), meaning, resting on the main supporting base thereof.

The transfer carriers (7, 7a, 7b) are configured to work in collaboration with each other, enabling the securing of an object (O) coming from the robotic collection means (4) by the pressure exerted on it by two adjacent transfer carriers (7, 7a, 7b) between which said object (O) is arranged, and the subsequent delivery thereof to the second conveyor belt (5) after releasing said pressure.

The transfer conveyor (6) is arranged in a tilted position ($6_I$) between the first conveyor belt (2) and the second conveyor belt (5). In turn, the transfer carriers (7, 7a, 7b) form a tilt angle ($\theta_7$) with respect to the transfer conveyor (6) of 135°, being arranged vertically in a collection position ($P_R$), and horizontally in a delivery position ($P_E$), FIG. 3.

Figure 1:
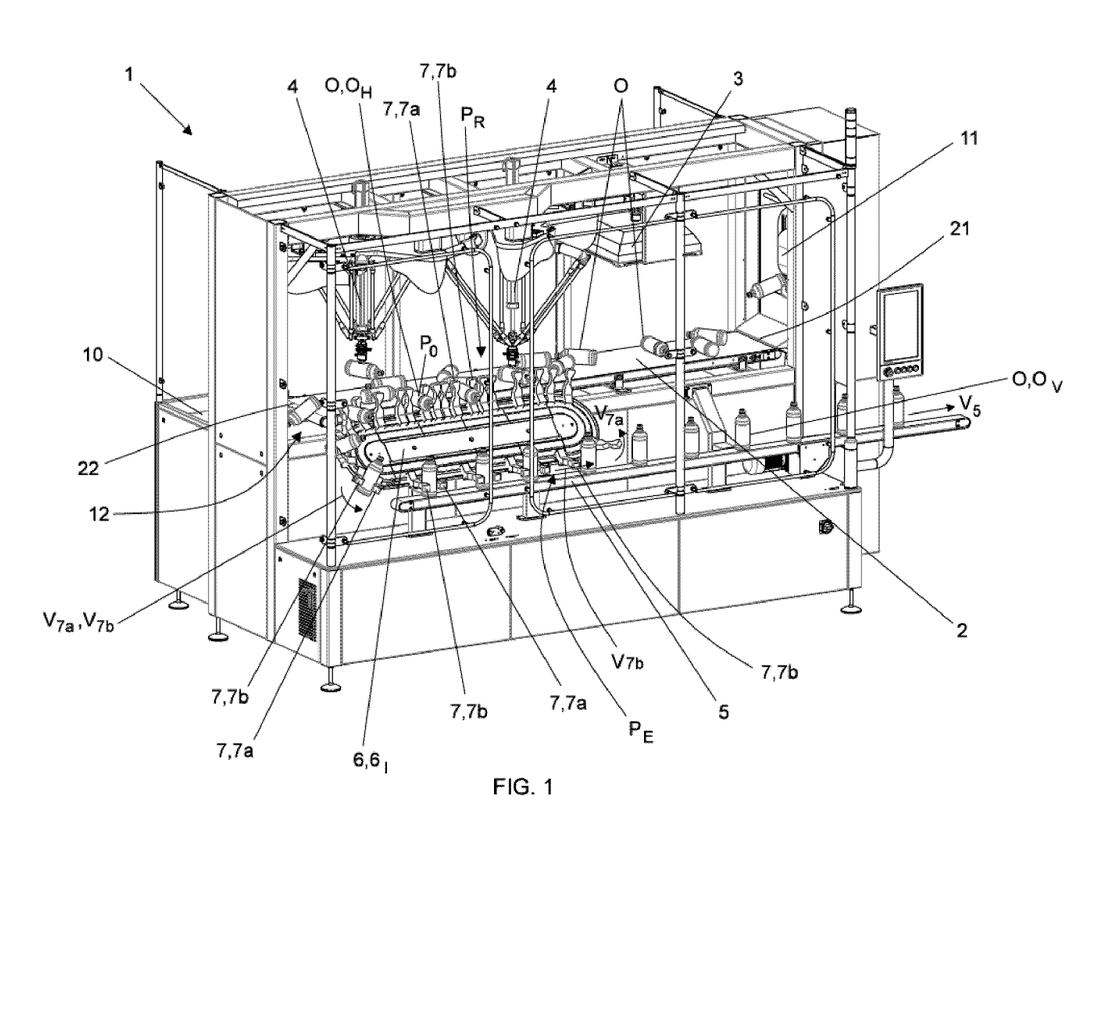
FIG. 1 is a general perspective view of the machine of the present invention, according to a first preferred embodiment, wherein the transfer conveyor is in a tilted arrangement between the first conveyor belt and the second conveyor belt.
Figure 2:
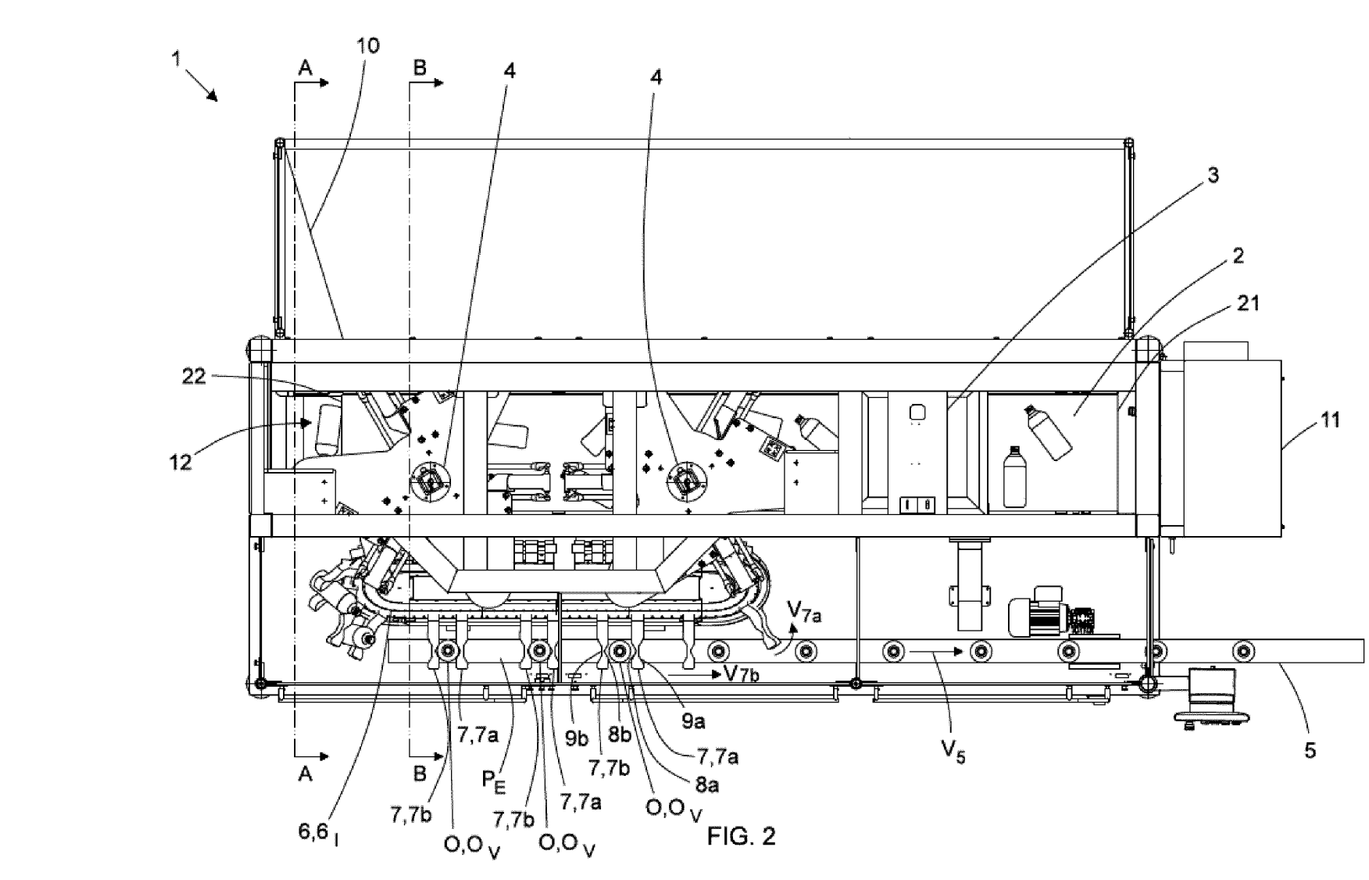
FIG. 2 is a plan view of the machine in FIG. 1.
Figure 3:
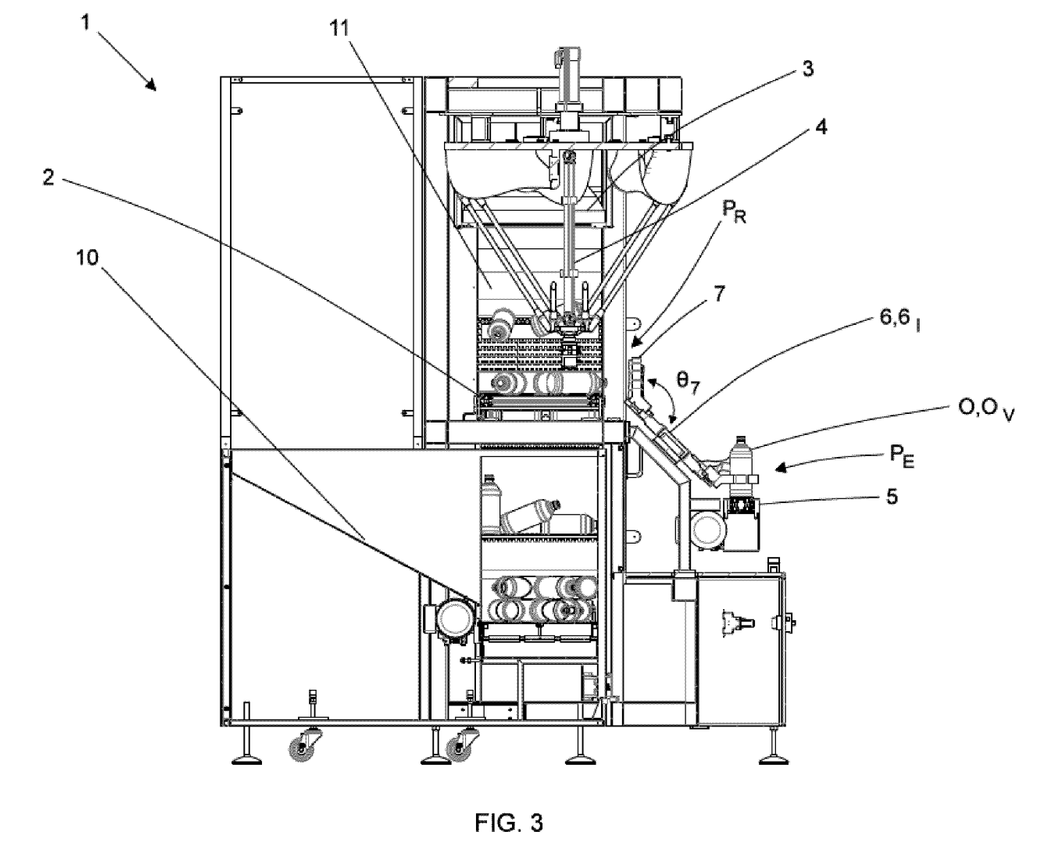
FIG. 3 is a profile view of a cross section of the machine according to the cross-section line A-A in FIG. 2.
Figure 4:
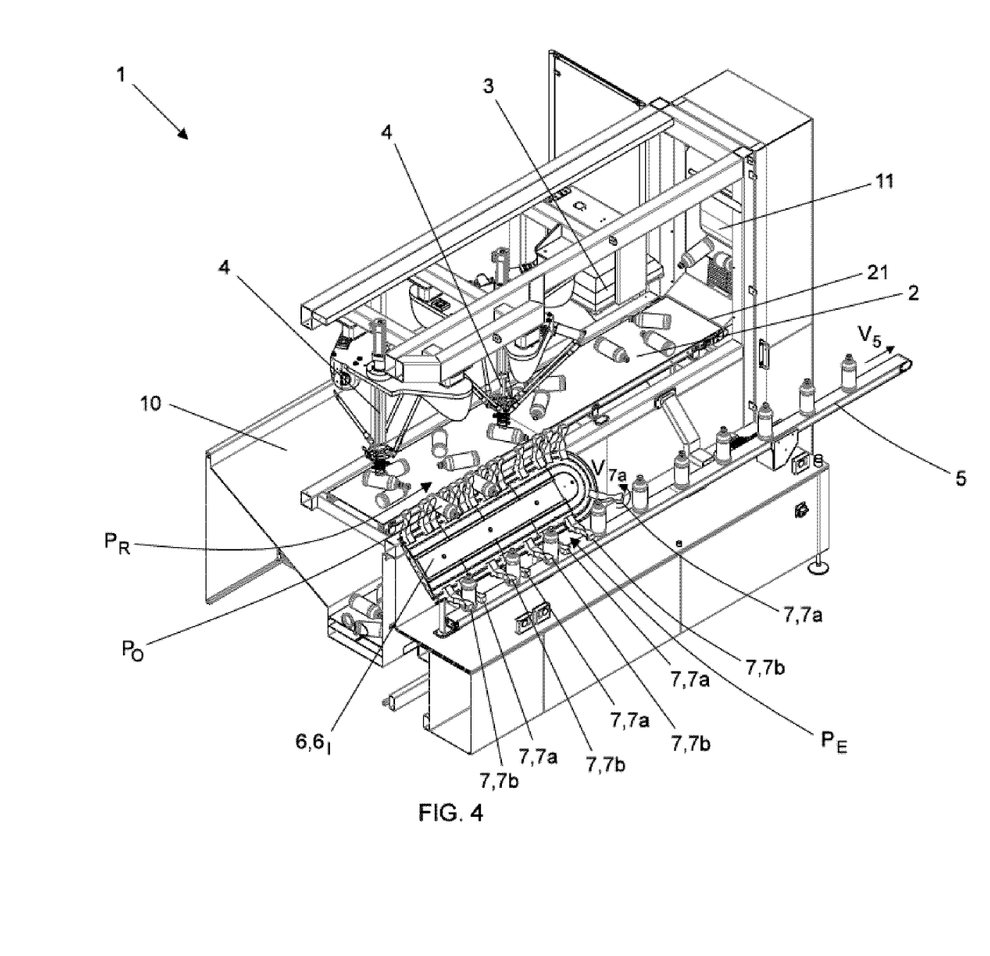
FIG. 4 is a perspective view of a cross section of the machine according to the cross-section line B-B in FIG. 2.
Figure 5:
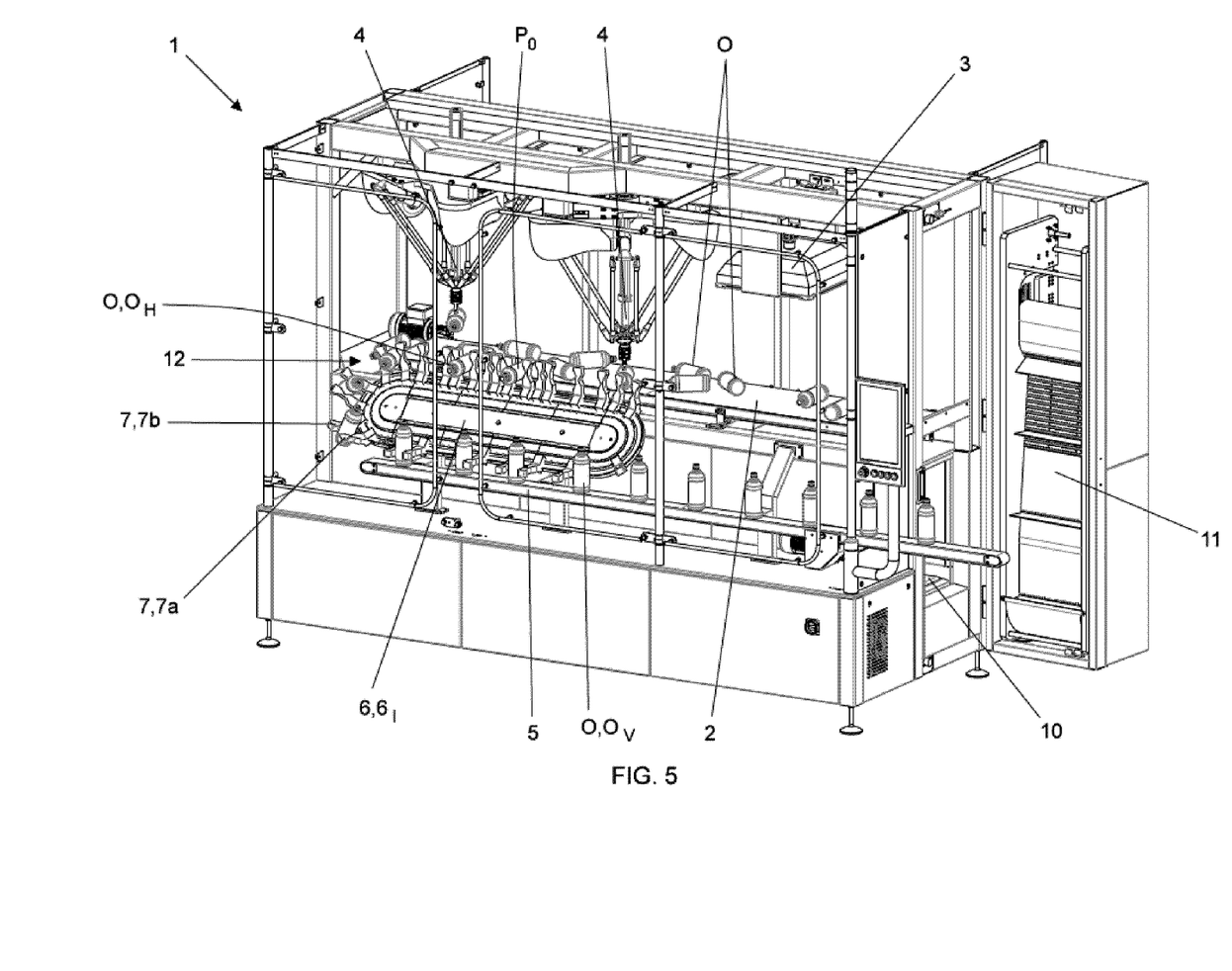
FIG. 5 is a general perspective view of the machine of the present invention, according to a first preferred embodiment, with the lifting side panel open.

According to this first assembly and/or location arrangement, the transfer carriers (7, 7a, 7b) receive the objects (O) coming from the robotic collection means (4) in a horizontal position ($O_H$) and deliver them in a vertical position ($O_V$) to the second conveyor belt (5).

Additionally, the machine (1) comprises:
a supply bin (10) configured to hold the objects (O) in a random manner; and
a lifter (11) configured to collect the objects (O) from the supply bin (10) and arrange them on a first end (21) of the first conveyor belt (2).

The machine (1) comprises a return track (12) adjacent to a second end (22) of the first conveyor belt (2), configured to receive the objects (O) that arrive at said second end (22) and return them to the supply bin (10) using gravity.

According to the present example, the delivery of the objects (O) to the second conveyor belt (5) is performed directly.

Figure 6:
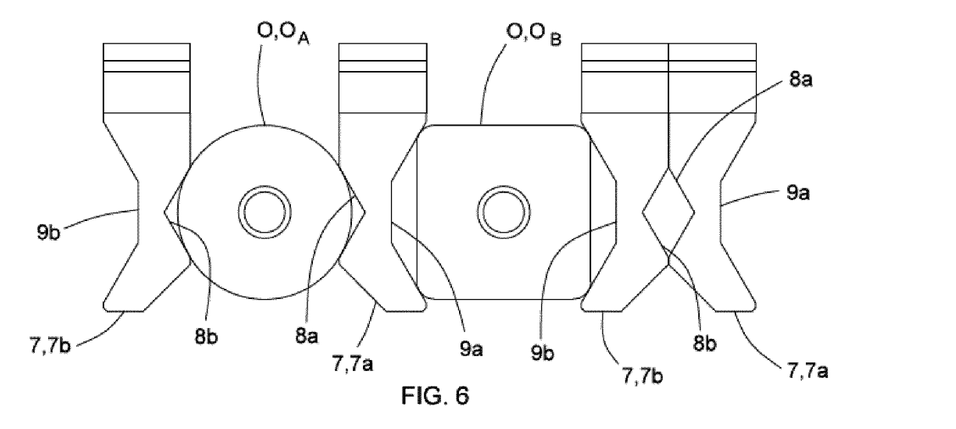
FIG. 6 is a detail of the transfer carriers.

As seen in FIG. 6, the transfer carriers (7) are made up of first transfer carriers (7a) and by second transfer carriers (7b), where the first transfer carriers (7a) and the second transfer carriers (7b) are distributed in an alternating manner along the transfer conveyor (6).

Each first transfer carrier (7*a*) comprises:

a first receiving profile (8*a*) configured to receive a first object ($O_A$) with a certain shape and/or size; and an additional first receiving profile (9*a*), distinct and opposite from the first receiving profile (8*a*), configured to receive a second object ($O_B$) with a shape and/or size different from the first object ($O_A$).

Each second transfer carrier (7*b*) comprises:

a second receiving profile (8*b*) configured to receive the first object ($O_A$); and an additional second receiving profile (9*b*), distinct and opposite from the second receiving profile (8*b*), configured to receive the second object ($O_B$).

Figure 7:
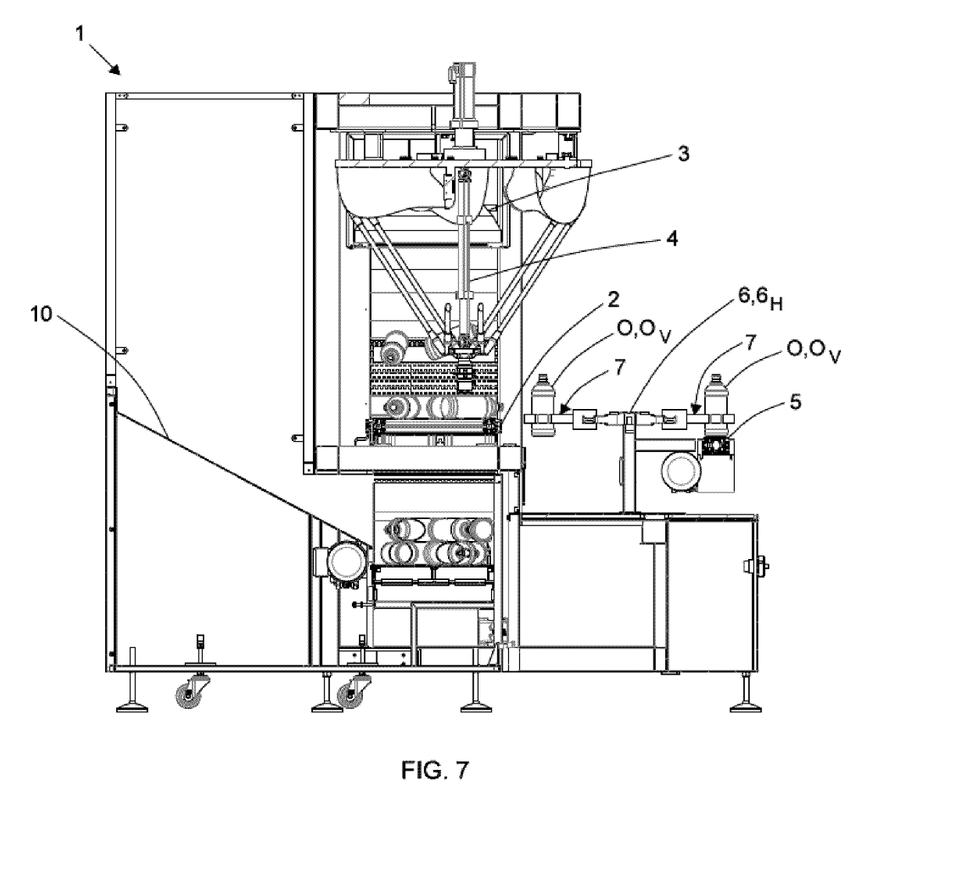
FIG. 7 is a profile view of a cross section of the machine of the present invention, according to a second preferred embodiment, wherein the transfer conveyor is in a horizontal arrangement between the first conveyor belt and the second conveyor belt.

FIG. 7 shows a view of the machine (1) of the present invention, according to a second preferred embodiment. In this case, the transfer conveyor (6) is arranged in a horizontal position ($6_H$) between the first conveyor belt (2) and the second conveyor belt (5). In turn, the transfer carriers (7) are arranged horizontally. The objects (O) are collected in a vertical position ($O_V$) and are delivered in a likewise vertical position ($O_V$).

Figure 8:
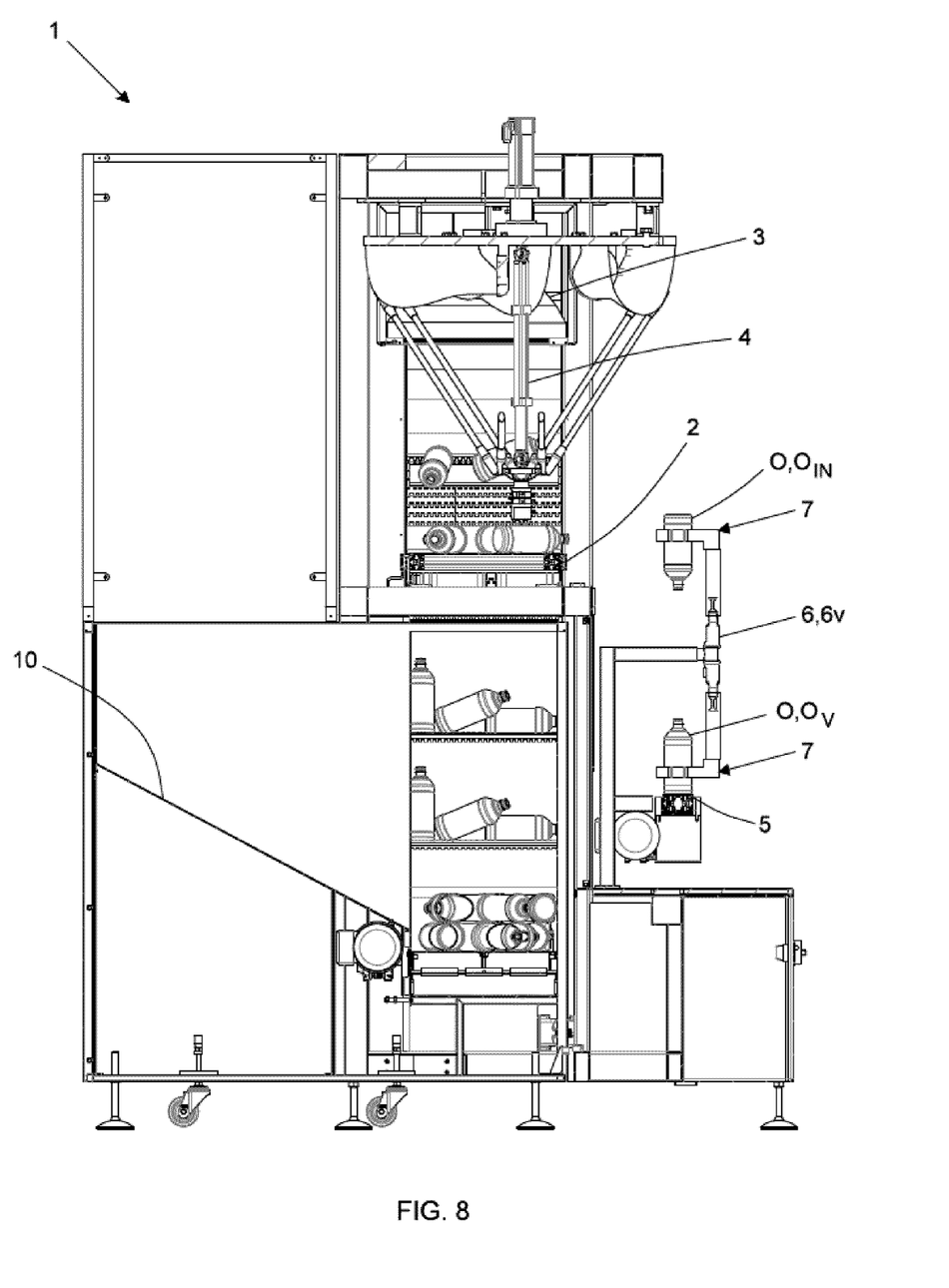
FIG. 8 is a profile perspective view of a cross-section of the machine, according to a third preferred embodiment, wherein the transfer conveyor is in a vertical arrangement between the first conveyor belt and the second conveyor belt.
Figure 9:
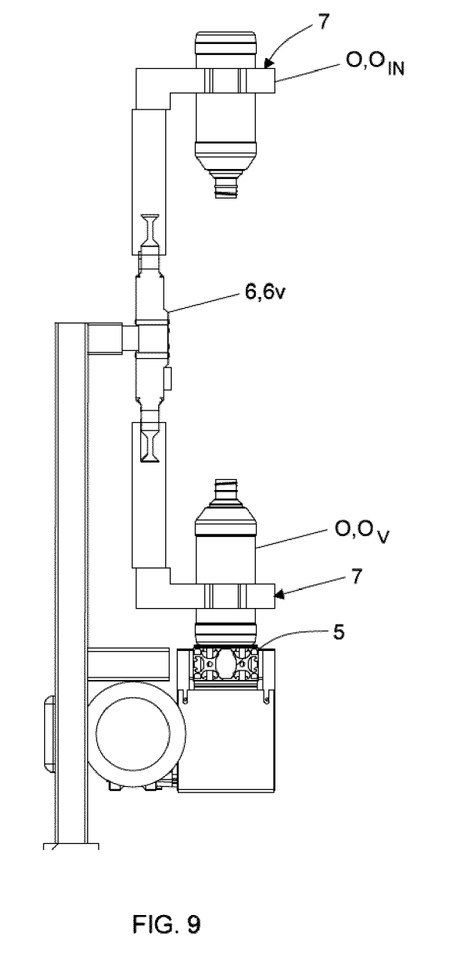
FIG. 9 is a partial profile view of the machine, according to a first variant of the third preferred embodiment.
Figure 10:
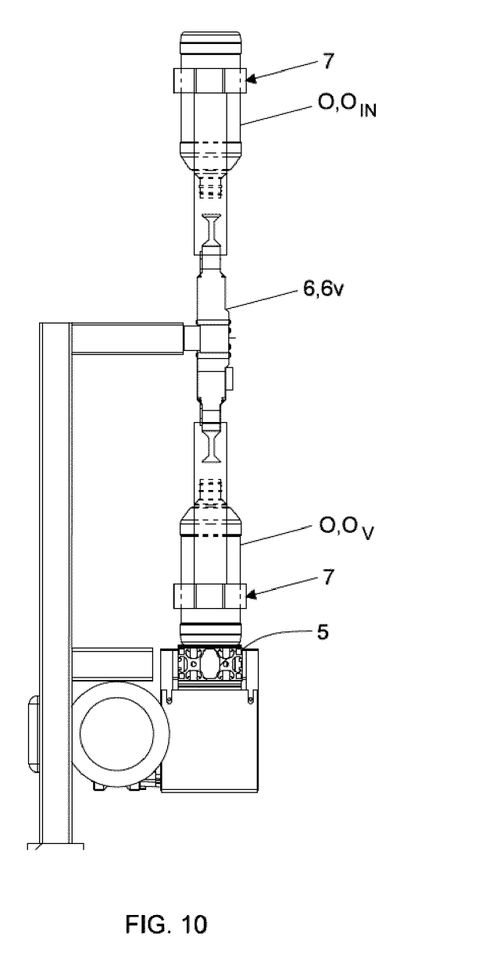
FIG. 10 is a partial profile view of the machine, according to a second variant of the third preferred embodiment.

FIGS. 8-10 show different views of the machine (1) of the present invention, according to a third preferred embodiment. In this case, the transfer conveyor (6) is arranged in a vertical position ($6_V$) between the first conveyor belt (2) and the second conveyor belt (5). The transfer carriers (7) receive the objects (O) coming from the robotic collection means (4) in an inverted vertical position ($O_{IN}$), and deliver them in a vertical position ($O_V$) after a 180° rotation of the transfer carriers (7) along the transfer conveyor (6). The end portion, or securing portion, of the transfer carriers (7) is arranged horizontally, FIG. 9, or vertically, FIG. 10.

Below, the method that the machine (1) of FIGS. 1-10 carries out is described. Specifically, said method comprises the following steps:

a) receiving a plurality of objects (O) arranged randomly on a first conveyor belt (2);

b) identifying the position and the shape of the objects (O) arranged on the first conveyor belt (2) by means of machine vision means (3); and c) collecting the objects (O) from the first conveyor belt (2) by means of robotic collection means (4) according to the information received from the machine vision means (3).

Said method is characterised in that it additionally comprises the following steps:

d) receiving the objects (O) coming from the robotic collection means (4) by means of transfer carriers (7, 7*a*, 7*b*, 7*c*) arranged in a transfer conveyor (6);

e) delivering said objects (O) to a second conveyor belt (5) by means of said transfer carriers (7, 7*a*, 7*b*, 7*c*) in order to enable the outlet thereof; and f) moving said transfer carriers (7, 7*a*, 7*b*, 7*c*) in a closed loop through the transfer conveyor (6) independently controlling the speed and position thereof in order to carry out steps d) and e).

Steps d) and e) respectively comprise the following steps:

d.1) receiving the objects (O) coming from the robotic collection means (4) in a predetermined position ($P_O$); and e.1) delivering said objects (O) to the second conveyor belt (5) in a vertical position ($O_V$).

Steps d) and e) respectively comprise the following steps:

d.2) securing an object (O) coming from the robotic collection means (4) by the pressure exerted on it by means of two adjacent transfer carriers (7, 7*a*, 7*b*) between which said object (O) is arranged; and e.2) delivering said object (O) to the second conveyor belt (5) after releasing said pressure.

Step f) comprises the following steps:

f.1.1) moving a first transfer carrier (7*a*) at a first speed ($v_{7a}$) to a collection position ($P_R$) within reach of the robotic collection means (4);

f.2.1) detaining the first transfer carrier (7*a*) in the collection position ($P_R$);

f.3.1) receiving an object (O) coming from the robotic collection means (4) in a predetermined position ($P_O$), arranging it adjacently to the first transfer carrier (7*a*);

f.4.1) moving a second transfer carrier (7*b*) at a second speed ($v_{7b}$) until it makes contact with the object (O) adjacent to the first transfer carrier (7*a*);

f.5.1) securing said object (O) by the pressure exerted on it between the first transfer carrier (7*a*) and the second transfer carrier (7*b*);

f.6.1) moving the first transfer carrier (7*a*) and the second transfer carrier (7*b*) to a delivery position ($P_E$) on the second conveyor belt (5) at a first speed ($v_{7a}$) and a second speed ($v_{7b}$) that are equal;

f.7.1) synchronising the first speed ($v_{7a}$) of the first transfer carrier (7*a*) and the second speed ($v_{7b}$) of the second transfer carrier (7*b*) with an outlet speed ($v_S$) of the second conveyor belt (5);

f.8.1) accompanying the object (O) along the second conveyor belt (5) at the outlet speed ($v_S$); and f.9.1) increasing the first speed ($v_{7a}$) of the first transfer carrier (7*a*), maintaining the second speed ($v_{7b}$) of the second transfer carrier (7*b*) at the outlet speed ($v_S$) in order to release the pressure on the object and drop it onto the second conveyor belt (5).

Figure 11:
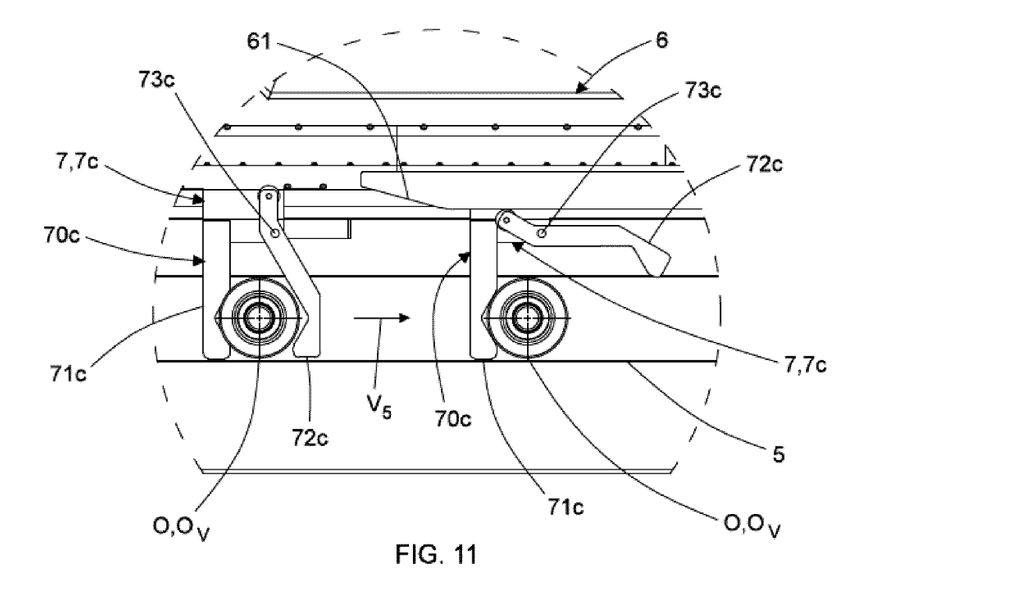
FIG. 11 is a detail view of the machine, according to a second embodiment of the transfer carriers.

FIG. 11 is a detail view of the machine (1), according to a second embodiment of the transfer carriers (7). As seen in this case, the transfer carriers (7) are made up of third transfer carriers (7*c*), where each of them comprises a gripper (70*c*) configured to grip an object (O) coming from the robotic collection means (4) and deliver said object (O) to the second conveyor belt (5).

According to the present example, the gripper (70*c*) is made up of:

a static gripper portion (71*c*) attached to the third transfer carrier (7*c*); and a dynamic gripper portion (72*c*) joined to the third transfer carrier (7*c*) by means of a joint (73*c*).

According to other embodiments, the gripper (70*c*) can admit multiple possible mechanical configurations. For example, the gripper (70*c*) can comprise one or more mobile portions in which all of them enable the function to be performed; on one hand, securing the object (O) in one point; and on the other, the releasing thereof onto the outlet conveyor belt (5).

In turn, the transfer conveyor (6) comprises one or more opening cams (61) in a static position, configured to come into contact with the dynamic gripper portion (72*c*) as the third transfer carrier (7*c*) passes and to cause the rotation thereof with respect to the joint (73*c*) in order to open the gripper (70*c*).

The method carried out by the machine (1) of FIG. 11 comprises an alternative step f). Specifically, said step f) comprises the following steps:

f.1.2) moving a third transfer carrier (7, 7*c*) at a third speed ($v_{7c}$) to a collection position ($P_R$) within reach of the robotic collection means (4);

f.2.2) detaining the third transfer carrier (7, 7*c*) in the collection position ($P_R$);

f.3.2) receiving an object (O) coming from the robotic collection means (4) in a predetermined position ($P_O$), arranging it in the gripper (70*c*);

f.4.2) moving the third transfer carrier (7, 7c) to a delivery position ($P_E$) on the second conveyor belt (5) at a third speed ($v_{7c}$);

f.5.2) synchronising the third speed ($v_{7c}$) of the third transfer carrier (7, 7c) with an outlet speed ($v_5$) of the second conveyor belt (5);

f.6.2) accompanying the object (O) along the second conveyor belt (5) at the outlet speed ($v_5$); and f.7.2) opening the gripper (70c).

Figure 12:
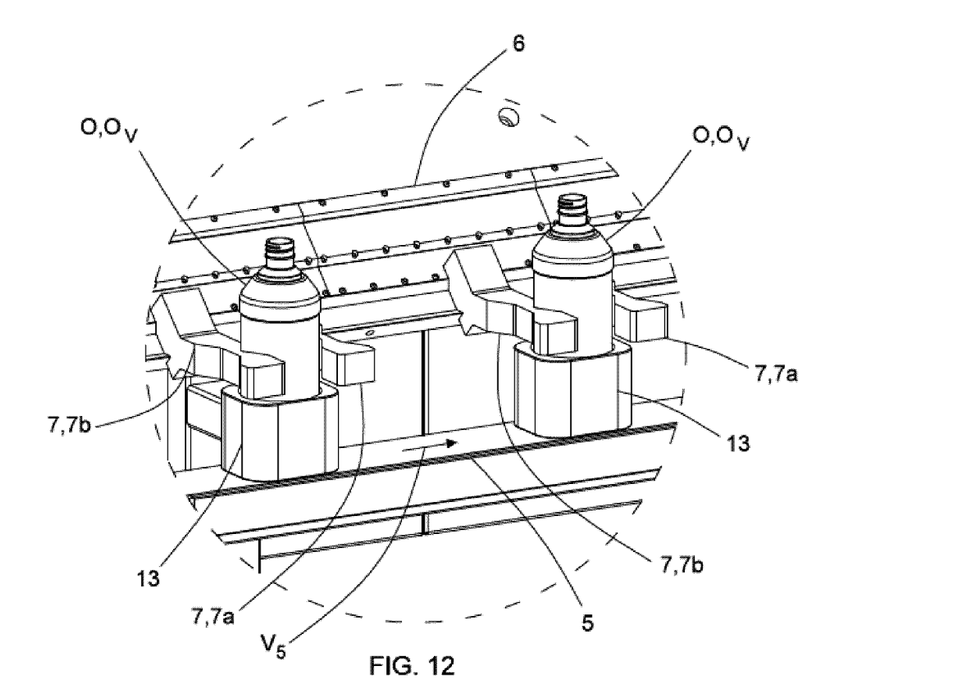
FIG. 12 is a detail view of the machine, wherein the objects are placed on supporting bases or pucks when the they are delivered to the second conveyor belt.

FIG. 12 is a detail view of the machine (1), wherein the objects (O) are placed on supporting bases (13) or pucks when the they are delivered to the second conveyor belt (5).

The invention claimed is:

1. A machine for positioning objects, comprising
a first conveyor belt configured to receive a plurality of objects (O);
machine vision means configured to identify the position and the shape of the objects (O) arranged on the first conveyor belt;
robotic collection means configured to collect the objects (O) from the first conveyor belt according to the information received from the machine vision means; and
a second conveyor belt configured to enable the outlet of said objects (O); wherein said machine comprises a transfer conveyor that has a plurality of transfer carriers configured to move by means of magnetic induction in a closed loop through it enabling the speed and position thereof to be individually controlled, where said transfer carriers are configured to receive the objects (O) coming from the robotic collection means and deliver said objects (O) to the second conveyor belt wherein the transfer conveyor is arranged in a tilted position between the first conveyor belt and the second conveyor belt, and the transfer carriers are configured to receive the objects (O) coming from the robotic collection means in a horizontal position ($O_H$) and deliver said objects (O) to the second conveyor belt in a vertical position ($O_V$); or wherein the transfer conveyor is arranged in a vertical position between the first conveyor belt and the second conveyor belt, and the transfer carriers, are configured to receive the objects (O) coming from the robotic collection means in an inverted vertical position ($O_{IN}$) and deliver said objects (O) to the second conveyor belt in a vertical position ($O_V$).

2. The machine for positioning objects according to claim 1, wherein the transfer carriers are configured to work in collaboration with each other, enabling the securing of an object (O) coming from the robotic collection means by the pressure exerted on it by two adjacent transfer carriers between which said object (O) is arranged, and the subsequent delivery thereof to the second conveyor belt after releasing said pressure.

3. The machine for positioning objects according to claim 1 wherein the transfer carriers comprises:
first transfer carriers; and
second transfer carriers;
where the first transfer carriers and the second transfer carriers are distributed along the transfer conveyor in an alternating manner.

4. The machine for positioning objects according to claim 3, wherein each first transfer carrier comprises:
a first receiving profile configured to receive a first object ($O_A$); and
an additional first receiving profile, distinct and opposite from the first receiving profile, configured to receive a second object ($O_B$);
and wherein each second transfer carrier comprises:
a second receiving profile configured to receive the first object ($O_A$); and
an additional second receiving profile, distinct and opposite from the second receiving profile, configured to receive the second object ($O_B$).

5. The machine for positioning objects according to claim 1, wherein the transfer carriers are made up of third transfer carriers wherein each of the third transfer carrier comprises a gripper configured to grip an object (O) coming from the robotic collection means and deliver said object (O) to the second conveyor belt.

6. The machine for positioning objects according to claim 5, wherein the gripper comprises:
a static gripper portion attached to the third transfer carrier and
a dynamic gripper portion joined to the third transfer carrier by means of a joint;
and wherein the transfer conveyor comprises an opening cam in a static position, configured to come into contact with the dynamic gripper portion as the third transfer carrier passes and to cause the rotation thereof with respect to the joint in order to open the gripper.

7. The machine for positioning objects according to claim 1, wherein the transfer carriers form a tilt angle with respect to the transfer conveyor, being arranged vertically in a collection position ($P_R$), and horizontally in a delivery position ($P_E$), when the transfer conveyor is arranged in a tilted position between the first conveyor belt and the second conveyor belt.

8. The machine for positioning objects according to claim 1, wherein the transfer carriers are arranged vertically or horizontally, when the transfer conveyor is arranged in a vertical position between the first conveyor belt and the second conveyor belt.

9. The machine for positioning objects according to claim 1, further comprising:
a supply bin configured to hold the objects (O) in a random manner; and
a lifter configured to collect the objects (O) from the supply bin and arrange them on a first end of the first conveyor belt.

10. The machine for positioning objects according to claim 9, further comprising:
a return track adjacent to a second end of the first conveyor belt, configured to receive the objects (O) that arrive at said second end and return them to the supply bin using gravity.

11. The machine for positioning objects according to any of claim 1, wherein each of the objects (O) is delivered to the second conveyor belt on a supporting base.

12. A method for positioning objects using the machine according to claim 1, comprising the following steps:
a) receiving a plurality of objects (O) on a first conveyor belt;
b) identifying the position and the shape of the objects (O) arranged on the first conveyor belt by means of machine vision means; and
c) collecting the objects (O) from the first conveyor belt by means of robotic collection means according to the information received from the machine vision means;
d) receiving the objects (O) coming from the robotic collection means by means of transfer carriers arranged in a transfer conveyor;

e) delivering said objects (O) to a second conveyor belt by means of said transfer carriers in order to enable the outlet thereof; and f) moving said transfer carriers by means of magnetic induction in a closed loop through the transfer conveyor individually controlling the speed and position thereof in order to carry out steps d) and e);

wherein the transfer carriers receive the objects (O) coming from the robotic collection means in a horizontal position ($O_H$) and deliver them in a vertical position ($O_v$) to the second conveyor belt, in a transfer conveyor in a tilted arrangement between the first conveyor belt and the second conveyor belt; or wherein the transfer receive the objects (O) coming from the robotic collection means in an inverted vertical position ($O_{IN}$) and deliver them in a vertical position ($O_v$) to the second conveyor belt, in a transfer conveyor in a vertical arrangement between the first conveyor belt and the second conveyor belt.

13. The method for positioning objects according to claim 12, wherein steps d) and e) respectively comprise the following steps:

d.1) receiving the objects (O) coming from the robotic collection means in a predetermined position ($P_O$); and e.1) delivering said objects (O) to the second conveyor belt in a vertical position ($O_v$).

14. The method for positioning objects according to claim 12, wherein steps d) and e) respectively comprise the following steps:

d.2) securing an object (O) coming from the robotic collection means by the pressure exerted on it by means of two adjacent transfer carriers between which said object (O) is arranged; and e.2) delivering said object (O) to the second conveyor belt after releasing said pressure.

15. The method for positioning objects according to claim 12, wherein step f) comprises the following steps:

f.1.1) moving a first transfer carrier at a first speed ($v_{7a}$) to a collection position ($P_R$) within reach of the robotic collection means;

f.2.1) detaining the first transfer carrier in the collection position ($P_R$);

f.3.1) receiving an object (O) coming from the robotic collection means in a predetermined position ($P_O$), arranging it adjacently to the first transfer carrier;

f.4.1) moving a second transfer carrier at a second speed ($v_{7b}$) until it makes contact with the object (O) adjacent to the first transfer carrier;

f.5.1) securing said object (O) by the pressure exerted on it between the first transfer carrier and the second transfer carrier;

f.6.1) moving the first transfer carrier and the second transfer carrier to a delivery position ($P_E$) on the second conveyor belt at a first speed ($v_{7a}$) and a second speed ($v_{7b}$) that are equal;

f.7.1) synchronising the first speed ($v_{7a}$) of the first transfer carrier and the second speed ($v_{7b}$) of the second transfer carrier with an outlet speed ($v_5$) of the second conveyor belt;

f.8.1) accompanying the object (O) along the second conveyor belt at the outlet speed ($v_5$); and f.9.1) increasing the first speed ($v_{7a}$) of the first transfer carrier, maintaining the second speed ($v_{7b}$) of the second transfer carrier at the outlet speed ($v_5$) in order to release the pressure on the object and drop it onto the second conveyor belt.

16. The method for positioning objects according to claim 12, wherein step f) comprises the following steps:

f.1.2) moving a third transfer carrier at a third speed ($v_{7c}$) to a collection position ($P_R$) within reach of the robotic collection means;

f.2.2) detaining the third transfer carrier in the collection position ($P_R$);

f.3.2) receiving an object (O) coming from the robotic collection means in a predetermined position ($P_O$), arranging it in a gripper of the third transfer carrier;

f.4.2) moving the third transfer carrier to a delivery position ($P_E$) on the second conveyor belt at a third speed ($v_{7c}$);

f.5.2) synchronising the third speed ($v_{7c}$) of the third transfer carrier with an outlet speed ($v_5$) of the second conveyor belt;

f.6.2) accompanying the object (O) along the second conveyor belt at the outlet speed ($v_5$); and f.7.2) opening the gripper.

* * * * *